US00RE43408E

(19) United States
(12) Reissued Patent
Dexter et al.

(10) Patent Number: US RE43,408 E
(45) Date of Reissued Patent: May 29, 2012

(54) LASER ETCHED SOCKET

(75) Inventors: Bruce Dexter, Simsbury, CT (US); Barry Buchanan, Mooresville, NC (US); Gary Cromer, Westminster, SC (US)

(73) Assignee: Apex Brands, Inc., Sparks, MD (US)

(21) Appl. No.: 29/267,220

(22) Filed: Aug. 11, 2006
(Under 37 CFR 1.47)

Related U.S. Patent Documents

Reissue of:
(64) Patent No.: Des. 501,768
Issued: Feb. 15, 2005
Appl. No.: 29/204,647
Filed: May 3, 2004

U.S. Applications:
(63) Continuation of application No. 29/175,699, filed on Feb. 7, 2003, now abandoned.

(51) LOC (9) Cl. ..... 08-05
(52) U.S. Cl. ..... D8/29
(58) Field of Classification Search ..... D8/21–29; 81/119, 120, 121.1, 125, 124.3, 124, 177.1, 81/177.85, DIG. 5, 436–437
See application file for complete search history.

(56) References Cited

U.S. PATENT DOCUMENTS

| | | | | |
|---|---|---|---|---|
| 4,420,995 | A | 12/1983 | Roberts | 81/60 |
| 4,836,059 | A | 6/1989 | Arnold | 76/114 |
| 4,936,170 | A | 6/1990 | Zumeta | 81/180.1 |
| 4,947,713 | A | 8/1990 | Arnold | 81/121.1 |
| 4,982,627 | A | 1/1991 | Johnson | 81/121.1 |

(Continued)

OTHER PUBLICATIONS

NAPA Tools and Equipment 2002-2003 advertisement.

(Continued)

*Primary Examiner* — Raphael Barkai
(74) *Attorney, Agent, or Firm* — Nelson Mullins Riley & Scarborough, LLP

(57) CLAIM

The ornamental design of a laser etched socket, illustrated substantially as shown and described.

DESCRIPTION

FIG. 1 is a perspective view of a laser etched socket embodying the design of the present invention, whereby the size indicia is defined by etching away a surface layer surrounding the size indicia so that the size indicia is distinguishable from the surrounding etched area;
FIG. 2 is a front elevational view of the laser etched socket illustrated in FIG. 1;
FIG. 3 is a rear elevational view of the laser etched socket illustrated in FIG. 1;
FIG. 4 is a right side elevational view of the laser etched socket illustrated in FIG. 1;
FIG. 5 is a left side elevational view of the laser etched socket illustrated in FIG. 1;
FIG. 6 is a top view of the laser etched socket illustrated in FIG. 1; and,
FIG. 7 is a bottom view of the laser etched socket illustrated in FIG. 1.
The broken lines are for illustrative purposes and form no part of the claim.

1 Claim, 2 Drawing Sheets

Matter enclosed in heavy brackets [ ] appears in the original patent but forms no part of this reissue; matter printed in italics indicates the additions made by reissue.

(AMENDED)

U.S. PATENT DOCUMENTS

| | | | | |
|---|---|---|---|---|
| 5,031,488 | A | 7/1991 | Zumeta | 81/180.1 |
| 5,053,440 | A | 10/1991 | Schueler et al. | 523/137 |
| 5,079,978 | A | 1/1992 | Kupfer | 81/119 |
| D359,669 | S | 6/1995 | Splingaire | D8/29 |
| 5,422,383 | A | 6/1995 | Takahashi et al. | 523/136 |
| 5,489,639 | A | 2/1996 | Faber et al. | 524/417 |
| D398,823 | S | 9/1998 | Hsieh | D8/29 |
| 5,819,606 | A | 10/1998 | Arnold | 81/124.3 |
| 5,910,197 | A | 6/1999 | Chaconas | 81/124.6 |
| 5,970,552 | A | 10/1999 | Kwiecien et al. | 7/143 |
| D425,770 | S | 5/2000 | Hsieh | D8/29 |
| 6,152,826 | A | 11/2000 | Profeta et al. | 464/159 |
| D439,481 | S | 3/2001 | Lin | D8/29 |
| D442,837 | S | 5/2001 | Porras | D8/29 |
| 6,257,096 | B1 | 7/2001 | Ling | 81/60 |
| 6,477,759 | B2 | 11/2002 | Hu | 29/527.2 |
| D484,376 | S | 12/2003 | Cromer | D8/29 |
| D500,435 | S | 1/2005 | Dexter et al. | D8/29 |
| D500,944 | S | 1/2005 | Dexter et al. | D8/29 |
| D523,305 | S | 6/2006 | Dexter et al. | D8/29 |

OTHER PUBLICATIONS

Suntex—Product Catalog 1998, ¼" Chrome Sockets and Sets.

2001/2002 Matco Tools Professional Hand Tools Catalog and Service Equipment, ½" Metric Impact Sockets.

2001/2002 Matco Tools Professional Hand Tools Catalog and Service Equipment, ¼" Impact Sockets.

Matco Tools; "Promo 5;" product launch flyer distributed at trade show in Apr. 2001; 2 pp.

Sears Catalog, Sep. 1, 1990, p. 25.

Matco Tools; product launch flyer distributed at trade show in Feb. 1993; 3 pp.

Sunex Tools; "New Tools, New Rules," product catalog; actual publication date unknown, but Applicant believes catalog was published more than 1-year prior to the filing of this Application.

U.S. Appl. No. 29/175,706 entitled "Laser Etched Socket," filed Feb. 7, 2003.

U.S. Appl. No. 29/175,663 entitled "Laser Etched Socket," filed Feb. 7, 2003.

U.S. Appl. No. 29/176,157 entitled "Laser Etched Socket," filed Feb. 19, 2003.

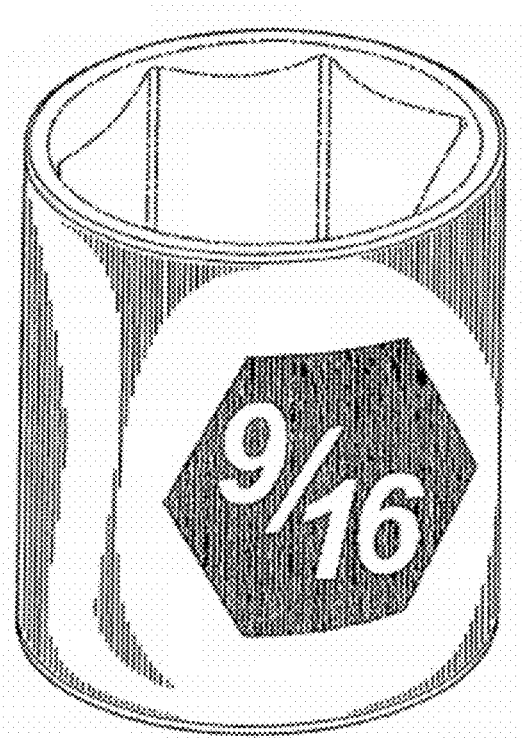
Fig. 1
(AMENDED)
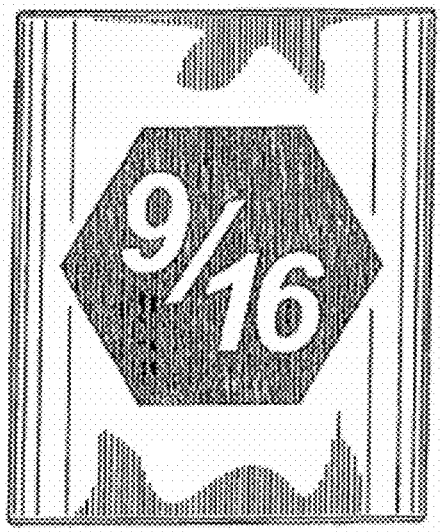
Fig. 2
(AMENDED)
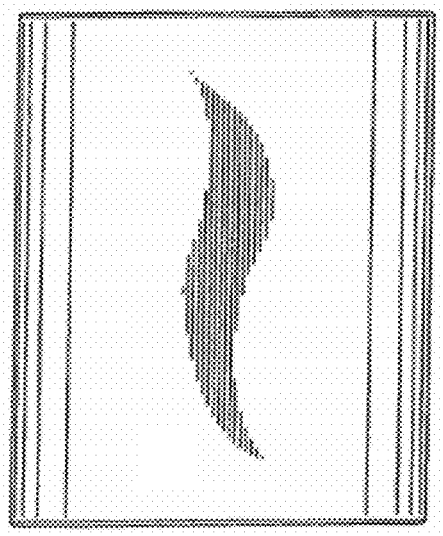
Fig. 3
(AMENDED)

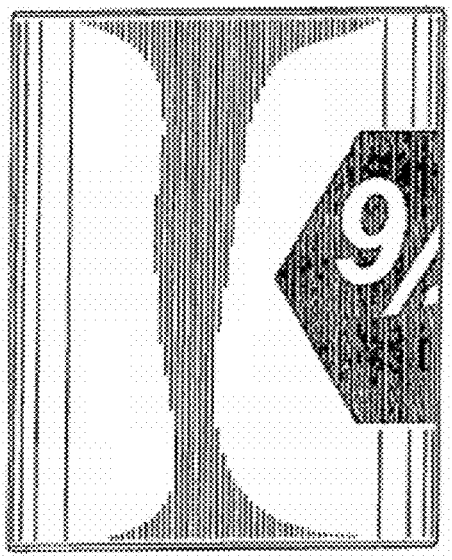
Fig. 4
(AMENDED)
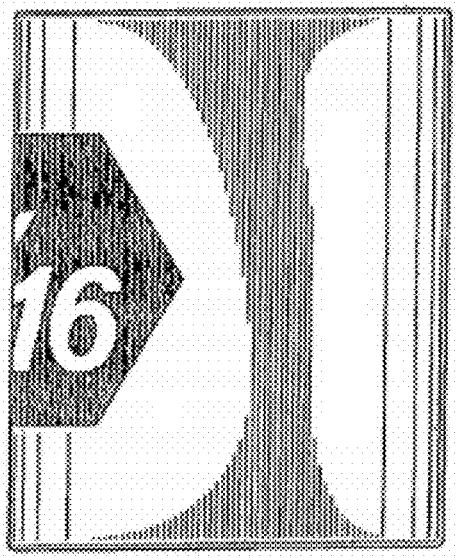
Fig. 5
(AMENDED)
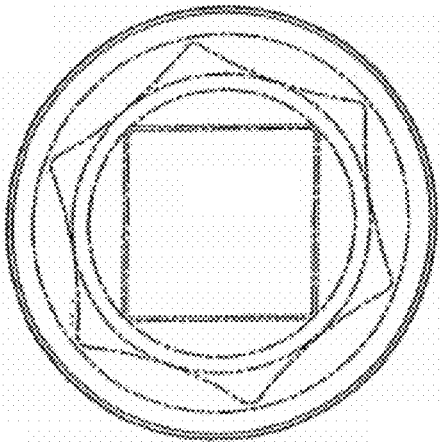
Fig. 6
(AMENDED)
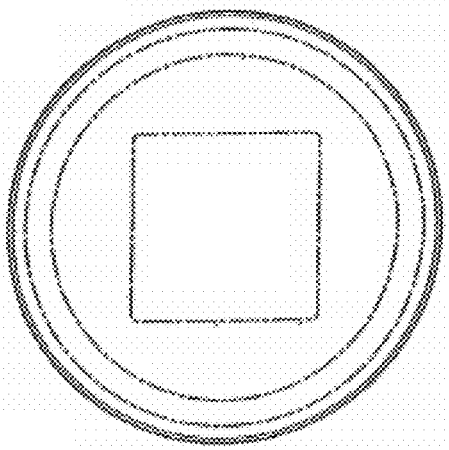
Fig. 7
(AMENDED)